Aug. 30, 1932.   P. F. BUCKLEY   1,874,885

MEANS TO PREVENT THE PASSAGE OF GREASE

Filed Aug. 16, 1928

INVENTOR
PHILLIP F. BUCKLEY.
by Hastings W. Baker
his ATTORNEY.

Patented Aug. 30, 1932

1,874,885

UNITED STATES PATENT OFFICE

PHILLIP F. BUCKLEY, OF LOS ANGELES, CALIFORNIA, ASSIGNOR TO OHMER FARE REGISTER COMPANY, OF DAYTON, OHIO

MEANS TO PREVENT THE PASSAGE OF GREASE

Application filed August 16, 1928. Serial No. 300,059.

It has been found that in many makes of hub odometers grease will gradually leak from the grease compartment of the hub to the registering dials of the odometer. When this occurs it is, of course, impossible to read the mileage registration on the dials. The object of this invention is to provide a means which will prevent the passage of grease or oil to the registering dials.

In the drawing—

Figure 1:
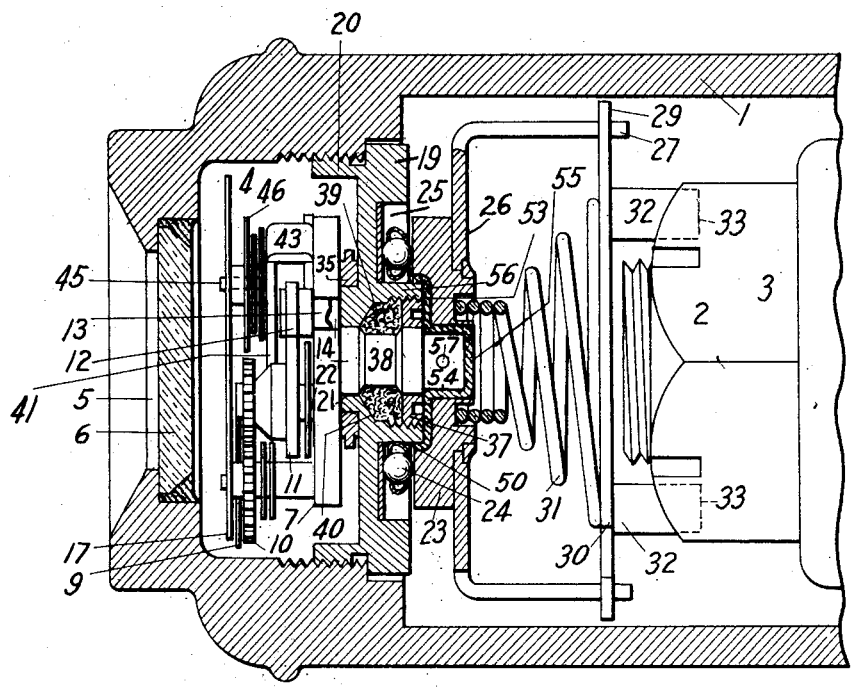
Fig. 1 is a longitudinal view of a conventional hub odometer partly in cross-section.

By way of illustration I have shown the invention as applied to the type of hub odometer described in the application of John B. Mills, Serial No. 740,166, filed September 27, 1924, now Patent No. 1,807,163, issued May 26, 1931, in which the hub cap 1 is rigidly secured to the hub of the wheel, not shown, which is rotatably mounted upon a fixed spindle or axle 2 and retained in position thereon by a nut 3. The registering mechanism is mounted in a recess 4 at the outer end of the hub cap and is held against rotation so that it is always in a position in which the registration can be readily read. The hub cap is provided with an opening 5 through which the registration may be read and this opening is preferably closed by a glass plate as shown at 6. Mounted in the recess 4 is a supporting member or plate 7 having arranged on one side thereof a series of studs, not shown, on which are mounted the registering dials 9 and their actuating mechanism. The actuating mechanism preferably consists of a train of gears 10 and a ratchet wheel 11 connected with said train of gears. Cooperating with the ratchet wheel 11 is an operating pawl 12 which causes the actuating mechanism to advance the registering dials or counters according to the distance traveled by the wheel. As here shown, this pawl is mounted on a pin 13 which is slidably mounted in a slot 14 in the supporting member 7 and is operated by the rotation of the hub relative to the supporting member 7 to cause the pawl 12 to actuate the registering mechanism. A face plate 17 is mounted on the supporting plate 7 by any conventional means.

The supporting plate 7 is so mounted that it is held against the rotation of the hub and its associated devices are permitted to rotate relative thereto. To this end there is shown a disk or plate 19 mounted in the hub cap at the inner end of the recess 4, this plate being preferably provided with a screw threaded flange 20 which is screwed into the opening forming the recess 4 and thus is caused to rotate with the hub cap 1. This plate 19 is provided with a central bearing 21 in which is journaled a stud or trunnion 22 carried by the supporting member 7 and which serves to support that member and the registering mechanism in their proper positions in the recess 4. The trunnion 22 extends beyond the rear end of the bearing 21 and has secured thereto a plate 23 which constitutes one member of a thrust bearing and engages anti-friction balls 24 which are confined between the same and the front wall of an annular recess 25 in the plate 19. Rigidly secured to the bearing plate 23 is a bracket 26 having rearwardly extending arms 27 which are provided with slots 28 adapted to receive fingers 29 carried by a yieldable plate or spider 30 which is pressed rearwardly by means of a spring 31 confined between the same and the bearing plate 23. The yieldable plate 30 is provided with rearwardly extending lugs 32 which enter recesses 33 in the nut 3, thereby causing the spider, the bracket 26 and the supporting member 7 to be anchored to the spindle 2 and thus held against rotation. The plate 19 is provided with an eccentric boss 34 forming part of the bearing 21 and on this boss is mounted a yoke or eccentric strap 35 in which the pin 13 is mounted. Pin 13 being held in slot 14 of the supporting member 7 will be held against rotation but will be free to slide in that slot. Consequently, the action of the eccentric 34 will impart reciprocatory movement to the pin and to the pawl carried thereby.

In order to prevent grease and oil from working their way between the bearing 21 and the trunnion 22 and thus entering the recess 4 and coming into contact with the registering dials suitable packing is provided. As here shown, the rear portion of the bearing 21 is enlarged and is closed by an annular nut 37, between which and the forward portion of the bearing is formed an annular recess 38 in the trunnion 22. The space so formed is adapted to receive a packing material of suitable character as shown at 39. Trunnion 22 is journaled at its front and rear portions in the bearing 21 and nut 37, which in effect forms part of the bearing. The bearing 21 forwardly of the space provided for the packing material is provided with a sloping circumferential surface 40 which terminates adjacent the forward portion of the annular recess 38 of the trunnion. When the packing nut 37 is tightened down it will exert pressure on the packing material 39 and the sloping surface 40 will force the material tightly into the recess 38. The pressure on the packing material will compress that portion thereof lying between the front and rear walls of the recess 38 but that portion of the material which is forced into the groove will not be compressed to so great a degree as the part lying between the nut 37 and surface 40 and will retain its flexibility to such an extent that it will not become glazed or hardened by its contact with the trunnion, but will be at all times capable of absorbing any grease which may pass between the nut and the trunnion. The bearing is, therefore, absolutely grease-proof.

If additional registering devices are necessary a supporting bracket may be provided which comprises the body portion 41 provided with off-set portion or arm 43 which preferably rests against the face of the supporting member 7. The body portion of the bracket is provided near its outer end with a stud 45 adapted to receive the additional dial which is here shown as 46.

Figure 2:
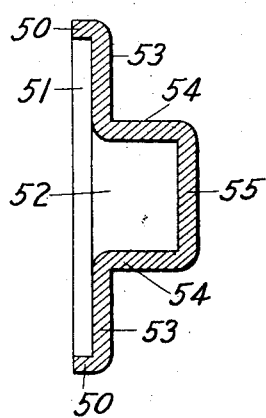
Fig. 2 is an elevational cross-sectional view of my improved grease leaking preventative cap.
Figure 3:
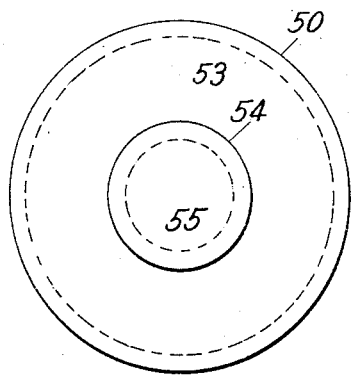
Fig. 3 is an elevational view thereof.

In Figs. 2 and 3 I have shown a grease leaking preventative cap which fits over the inner end of the trunnion 22, over the nut 37 and over the flange 56 of the plate 19. This cap consists of a plate 55 which fits over the inner end of the trunnion 22, a cylinder 54 formed integral with the plate 55, a plate 53 parallel with the plate 55 and integral with the cylinder 54 which plate 53 extends from the trunnion 22 over the nut 37 and over the flange 56 of the plate 19, and which plate 53 is formed integral with a cylindrical flange 50 which extends outwardly over the flange 56. The space formed by the cylindrical flange 50 and the plate 53 constitutes an enlarged cup-shaped portion sufficiently large to house the recited parts while the space bounded by the cylinder 54 and the plate 55 constitutes a cup-like chamber smaller in size than the space 51, which space 52 received the inner end of the trunnion 22. If desired the cylinder 54 and the parts integral therewith may be secured to the trunnion 2 by means of a pin 57.

I realize that changes may be made in the specific form of construction shown by way of illustration herein and I, therefore, desire to claim the invention broadly regardless of the specific form or embodiment thereof and regardless of the type of hub odometer with which it may be associated.

I claim—

1. In a hub odometer, a trunnion, a plate and a grease cap to fit over the entire end of said trunnion and over part of said plate.

2. In a hub odometer, a trunnion, a plate and a grease cap to fit over the entire end of said trunnion and over part of said plate, said trunnion and plate having relative rotary movement.

3. In a hub odometer, a non-rotary trunnion, a rotary plate and a grease cap to fit over the entire end of said trunnion and over a part of said plate.

4. In a hub odometer, a non-rotary trunnion, a rotary plate, packing means between said trunnion and said plate, a packing nut for said packing means, and a grease cap to fit over the entire end of said trunnion and nut and over a part of said plate.

5. In a hub odometer, a non-rotary trunnion, a rotary plate and a grease cap secured to said trunnion and fitting over the entire end of said trunnion and over a part of said plate.

6. In a hub odometer, a trunnion, a plate, a nut interposed between said trunnion and plate, and a cap forming two cup-shaped parts, one of said parts housing the trunnion and the other of said parts extending from the trunnion over said nut and over and around a part of said plate.

7. In a hub odometer, a trunnion, a plate, a nut interposed between said trunnion and plate, said plate being provided with a recess and a cap forming two cup-shaped parts, one of said parts housing the trunnion and the other of said parts extending from the trunnion over said nut and over and around a part of said plate and extending into the recess thereof.

In testimony whereof I affix my signature.

PHILLIP F. BUCKLEY.